United States Patent
Rassam et al.

(10) Patent No.: US 11,658,842 B2
(45) Date of Patent: May 23, 2023

(54) METHODS AND APPARATUS FOR ADAPTIVE INTERACTION WITH REMOTE DEVICES

(71) Applicant: Anmar Rassam, Surrey (GB)

(72) Inventors: Anmar Rassam, Surrey (GB); Payam Barnaghi, Surrey (GB)

(73) Assignee: Anmar Rassam, Surrey (GB)

( * ) Notice: Subject to any disclaimer, the term of this patent is extended or adjusted under 35 U.S.C. 154(b) by 0 days.

(21) Appl. No.: 16/489,269

(22) PCT Filed: Feb. 27, 2018

(86) PCT No.: PCT/GB2018/050503
§ 371 (c)(1),
(2) Date: Aug. 27, 2019

(87) PCT Pub. No.: WO2018/158564
PCT Pub. Date: Sep. 7, 2018

(65) Prior Publication Data
US 2020/0119938 A1    Apr. 16, 2020

(30) Foreign Application Priority Data

Feb. 28, 2017   (GB) .................................... 1703218

(51) Int. Cl.
*H04L 12/28* (2006.01)
*G06F 21/31* (2013.01)
*H04L 41/0273* (2022.01)
*H04L 41/22* (2022.01)

(52) U.S. Cl.
CPC ............ *H04L 12/282* (2013.01); *G06F 21/31* (2013.01); *H04L 12/2807* (2013.01);
(Continued)

(58) Field of Classification Search
CPC ............. H04L 12/2807; H04L 12/2829; H04L 41/0273; H04L 41/22; H04L 2012/2841;
(Continued)

(56) References Cited

U.S. PATENT DOCUMENTS 10,509,644 B2 * 12/2019 Shoavi .................... G06F 21/54
2003/0202008 A1 * 10/2003 McDonald ............. H04L 29/06
715/736

(Continued)

FOREIGN PATENT DOCUMENTS

WO    WO 01/08152    2/2001
WO    2010135174    11/2010
(Continued)

OTHER PUBLICATIONS

EP; International Search Report in the International Application No. PCT/GB2018/050503 dated Apr. 24, 2018.

*Primary Examiner* — Hitesh Patel

(57) ABSTRACT

Methods and Apparatus for Adaptive Interaction with Remote Devices Methods and apparatus for adaptively interacting with remote devices via a separate user device are disclosed. The user device can configure a user interface (UI) for interacting with the remote device on the basis of received device information associated with the remote device, the UI including one or more UI elements for controlling the user device to interact with the remote device. The device information defines one or more types of interaction between the user device and the remote device, and comprises a script for converting user input into an interaction request capable of being understood by the remote device. In response to user input relating to one of the one or more UI elements, the user device is caused to perform the associated type of interaction with the remote device. This approach enables the UI to be adapted according to the particularly types of interaction that are supported (Continued)

by the connected remote device. Local and remote discovery methods for obtaining the device information are also disclosed.

18 Claims, 7 Drawing Sheets

(52) U.S. Cl.
CPC ...... *H04L 12/2829* (2013.01); *H04L 41/0273* (2013.01); *H04L 41/22* (2013.01); *H04L 2012/2841* (2013.01)

(58) Field of Classification Search
CPC ............... H04L 67/2823; H04L 12/282; H04L 12/2803; H04L 12/2816; H04L 67/12
USPC .......................................................... 709/223
See application file for complete search history.

(56) References Cited

U.S. PATENT DOCUMENTS

| | | | |
|---|---|---|---|
| 2009/0306834 A1* | 12/2009 | Hjelm | ...................... H04L 67/24 701/1 |
| 2010/0201891 A1* | 8/2010 | Laroia | .................... G08C 17/00 348/734 |
| 2011/0238731 A1 | 9/2011 | Corson | |
| 2011/0264753 A1* | 10/2011 | Park | ....................... G06F 21/305 709/206 |
| 2014/0117921 A1* | 5/2014 | Suomela | .................. H02J 7/342 320/103 |
| 2015/0081878 A1* | 3/2015 | Pabba | ................. H04L 41/0806 709/224 |
| 2015/0319046 A1 | 11/2015 | Plummer | |
| 2016/0072809 A1* | 3/2016 | Rezvani | ................ H04M 1/725 726/5 |
| 2016/0277873 A1* | 9/2016 | Park | ....................... H04L 25/4906 |
| 2017/0124853 A1* | 5/2017 | Mehta | .................. G08B 25/009 |
| 2018/0062939 A1* | 3/2018 | Kulkarni | .............. H04L 41/0806 |
| 2018/0188915 A1* | 7/2018 | Riera | ...................... G06F 3/0484 |
| 2018/0331894 A1* | 11/2018 | Naga | ................... H04L 41/0803 |
| 2018/0338008 A1* | 11/2018 | Trinite | ................ H04L 65/1073 |

FOREIGN PATENT DOCUMENTS

| | | |
|---|---|---|
| WO | WO 2010/135174 | 11/2010 |
| WO | 0108152 | 2/2011 |

* cited by examiner

METHODS AND APPARATUS FOR ADAPTIVE INTERACTION WITH REMOTE DEVICES

TECHNICAL FIELD

The present invention relates to adaptively interacting with remote devices, such as Internet-of-Things (IoT) devices, to perform various functions.

BACKGROUND

The number of devices and smart objects that are participating in the IoT infrastructure is exploding and growing exponentially. According to some estimates, the number of interconnected devices is expected to grow to over 30 billion by the year 2020. As the number and variety of IoT devices increases, interaction with the disparate devices becomes increasingly complex. Current solutions for controlling IoT devices from a separate user device, such as a smartphone, require a dedicated application to be installed on the user device which is specific to the particular IoT device in question. This results in many different applications needing to be installed in order for a particular user device to be able to interact with many different IoT devices.

The invention is made in this context.

SUMMARY OF THE INVENTION

According to a first aspect of the present invention, there is provided a method of interacting with a remote device via a user device, the method comprising: discovering a remote device capable of interacting with the user device, in the vicinity of the user device; receiving device information associated with the discovered remote device at the user device, wherein the device information defines one or more types of interaction between the user device and the remote device and comprises a script for converting user input into an interaction request capable of being understood by the remote device; configuring a user interface UI based on the received device information, the UI comprising one or more UI elements for controlling the user device to interact with the remote device; receiving user input relating to one of the one or more UI elements; using the script to convert the received user input into an interaction request capable of being understood by the remote device; and causing the user device to interact with the remote device in accordance with the UI element to which the received user input relates, and in accordance with the received user input, by transmitting said interaction request to the remote device.

In some embodiments according to the first aspect, receiving the device information comprises: receiving a device identifier and a Uniform Resource Identifier URI from the remote device; sending a request for the device information to a server identified by the URI, the request including the received device identifier; and receiving the device information from the server. This may be referred to as a 'remote discovery' procedure.

In some embodiments according to the first aspect, the device information is received from the remote device. This may be referred to as a 'local discovery' procedure.

In some embodiments according to the first aspect, the user device is configured to interact with the remote device in accordance with a predefined protocol, and discovering a remote device capable of interacting with the user device comprises: performing device discovery to discover one or more remote devices within the vicinity of the user device; and for each of the discovered one or more remote devices, determining that the remote device is capable of interacting with the user device if the remote device supports the predefined protocol.

In some embodiments according to the first aspect, the UI is a graphical user interface and the method further comprises displaying the UI.

In some embodiments according to the first aspect, for each of the one or more UI elements the device information identifies one of a plurality of predefined UI element types, and displaying the UI comprises: for each of the one or more UI elements, retrieving a stored texture associated with the type of UI element identified by the device information; and rendering the UI element using the retrieved texture.

According to a second aspect of the present invention, there is provided a method comprising: retrieving device information stored at a remote device for configuring a user interface UI for controlling a user device to interact with the remote device, the device information defining one or more types of interaction between the user device and the remote device and comprising a script for converting user input received at the user device into an interaction request capable of being understood by the remote device; and transmitting the device information to the user device.

In some embodiments according to the second aspect, the method further comprises: receiving an interaction request identifying one of the one or more types of interaction, from the user device; and causing the remote device to interact with the user device in accordance with the received interaction request.

According to a third aspect of the present invention, there is provided a method comprising: receiving a request for device information for configuring a user interface UI for controlling a user device to interact with a remote device, the device information defining one or more types of interaction between the user device and the remote device and comprising a script for converting user input received at the user device into an interaction request capable of being understood by the remote device, the request for device information including a device identifier ID for identifying the remote device, wherein the request for device information is received at a server; retrieving stored device information associated with the remote device identified by the received device ID, at the server; and transmitting the retrieved device information from the server to the user device.

In some embodiments according to the third aspect, the method further comprises: receiving an interaction request from the user device at the remote device, the interaction request identifying one of the one or more types of interaction; and causing the remote device to interact with the user device in accordance with the received interaction request.

In some embodiments according to the second or third aspect, the stored device information defines one or more conditional interaction types, wherein each of the conditional interaction types is only permitted if an associated condition is fulfilled, and retrieving the device information comprises: selecting each of the one or more conditional interaction types according to whether or not the associated condition for said one of the conditional interaction types is fulfilled, wherein the transmitted device information only defines the selected one or more conditional interaction types from among the plurality of conditional interaction types.

In some embodiments according to the first, second or third aspect, the device information defines how the one or more UI elements should be displayed in the user interface.

The device information may further define one or more of a size, shape, orientation and position of each of the one or more UI elements in the UI.

In some embodiments according to the first, second or third aspect, the method further comprises steps of: authenticating a current user; and determining a security level of the authenticated user, wherein the device information only defines one or more types of interaction that are permitted for the security level of the authenticated user. For example, in some embodiments the user can be authenticated and/or the security level can be determined based on one or more of: a user identity; a password; and a proximity of the user device and the remote device, wherein the user is authenticated and/or a different security level is selected according to whether a distance between the user device and the remote device is above or below a threshold distance.

According to a fourth aspect of the present invention, there is provided a non-transitory computer-readable storage medium adapted to store computer program instructions which, when executed, perform a method according to any one of the first, second or third aspects.

According to a fifth aspect of the present invention, there is provided apparatus for interacting with a remote device via a user device, the apparatus comprising: one or more processors for executing computer program instructions; and memory adapted to store computer program instructions which, when executed by the one or more processors, cause the apparatus to: discover a remote device capable of interacting with the user device, in the vicinity of the user device; receive device information associated with the discovered remote device at the user device, wherein the device information defines one or more types of interaction between the user device and the remote device and comprises a script for converting user input into an interaction request capable of being understood by the remote device; configure a user interface UI based on the received device information, the UI comprising one or more UI elements for controlling the user device to interact with the remote device; receive user input relating to one of the one or more UI elements; use the script to convert the received user input into an interaction request capable of being understood by the remote device; and cause the user device to interact with the remote device in accordance with the UI element to which the received user input relates, and in accordance with the received user input, by transmitting said interaction request to the remote device.

According to a sixth aspect of the present invention, there is provided apparatus for causing a remote device to interact with a user device, the apparatus comprising: one or more processors for executing computer program instructions; and memory adapted to store computer program instructions which, when executed by the one or more processors, cause the apparatus to: retrieve stored device information for configuring a user interface UI for controlling the user device to interact with the remote device, the device information defining one or more types of interaction between the user device and the remote device and comprising a script for converting user input received at the user device into an interaction request capable of being understood by the remote device; transmit the device information to the user device; receive an interaction request identifying one of the one or more types of interaction, from the user device; and cause the remote device to interact with the user device in accordance with the received interaction request.

According to a seventh aspect of the present invention, there is provided apparatus for providing device information associated with a remote device capable of interacting with a user device, the apparatus comprising: one or more processors for executing computer program instructions; and memory adapted to store computer program instructions which, when executed by the one or more processors, cause the apparatus to: receive a request for device information for configuring a user interface UI for controlling the user device to interact with the remote device, the device information defining one or more types of interaction between the user device and the remote device and comprising a script for converting user input received at the user device into an interaction request capable of being understood by the remote device, the request for device information including a device identifier ID for identifying the remote device; retrieve stored device information associated with the remote device identified by the received device ID; and transmit the retrieved device information to the user device.

According to an eighth aspect of the present invention, there is provided a system comprising: a remote device comprising the apparatus according to the sixth aspect; and a user device for interacting with the remote device, the user device comprising the apparatus according to the fifth aspect.

According to a ninth aspect of the present invention, there is provided a system comprising: a remote device comprising the apparatus according to the sixth aspect; a user device for interacting with the remote device, the user device comprising the apparatus according to the fifth aspect; and a server for providing the device information to the user device, the server comprising the apparatus according to the seventh aspect.

BRIEF DESCRIPTION OF THE DRAWINGS

Embodiments of the present invention will now be described, by way of example only, with reference to the accompanying drawings, in which.

DETAILED DESCRIPTION

Figure 1:
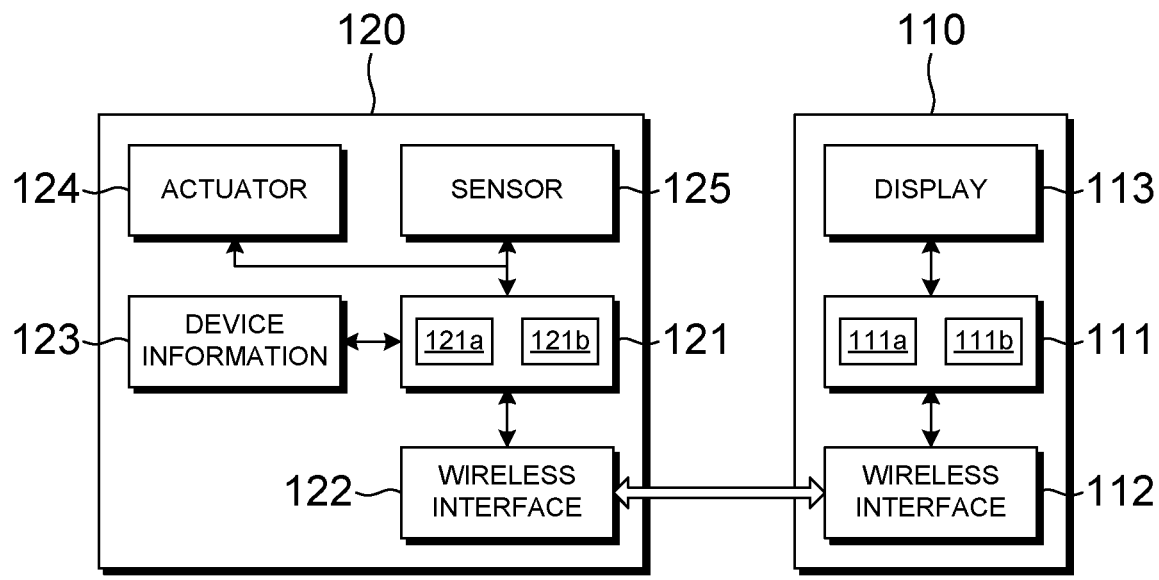
FIG. 1 illustrates a system comprising a user device and a remote device capable of wireless communication, according to an embodiment of the present invention.

In the following detailed description, only certain exemplary embodiments of the present invention have been shown and described, simply by way of illustration. As those skilled in the art would realize, the described embodiments may be modified in various different ways, all without departing from the scope of the present invention. Accordingly, the drawings and description are to be regarded as illustrative in nature and not restrictive. Like reference numerals designate like elements throughout the specification.

Figure 2:
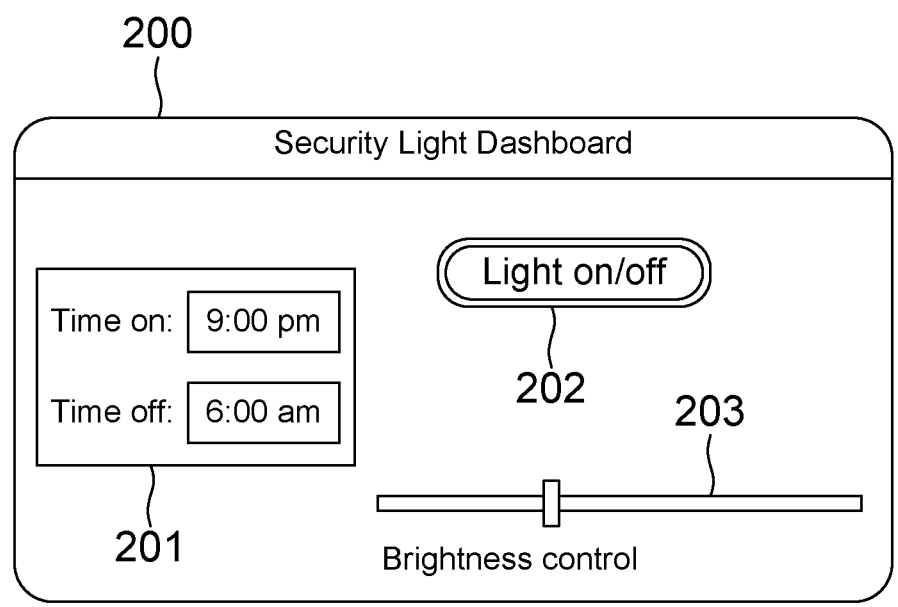
FIG. 2 illustrates a user interface displayed at the user device in the system of FIG. 1, according to an embodiment of the present invention.

Referring now to FIG. 1, a system comprising first and second devices capable of wireless communication is illustrated, according to an embodiment of the present invention. The first device 110 can be any type of device that is configured to be operated by a user, by displaying a user interface and receiving user input. The first device 110 is hereinafter referred to as a 'user device'. A user interface 200 displayed at the user device 110 is illustrated in FIG. 2. Examples of types of device that may be suitable for use as the first device 110 include, but are not limited to, smartphones, tablets, laptop or desktop computers, and wearable electronic devices.

The second device 120 can be any type of device that is capable of wireless communication, and which can interact with the user device 110. The second device 120 is physically separate from the user device 110, and hence is hereinafter referred to as a 'remote device'. In some embodiments the remote device 120 may be an Internet-of-Things (IoT) device, for example a wireless sensor or actuator. Depending on the embodiment, the interaction may simply involve a flow of data between the user device 110 and the remote device 120, for example the remote device 120 may transmit sensor data to the user device 110, or the interaction may involve the user device 110 controlling the second device 120 to perform a particular function.

The user device 110 and the remote device 120 can communicate via any suitable wireless interface. In the present embodiment, the user device and the remote device communicate over a Bluetooth Low Energy (BLE) connection. However, in other embodiments the user device and the remote device may communicate with each other over a different type of interface, for example Bluetooth Classic or WiFi.

As shown in FIG. 1, the user device 110 of the present embodiment comprises a processing unit 111, wireless interface 112, and display 113. The processing unit 111 comprises one or more processors 111a for executing computer program instructions, and further comprises computer-readable memory 111b. The computer-readable memory 111b is adapted to store computer program instructions which, when executed by the one or more processors 111a, may cause the user device 110 to perform the respective steps carried out by the user device 110 in any of the methods disclosed herein. Together, the one or more processors 111a and the computer-readable memory 111b of the user device 110 form apparatus for controlling the user device 110 to interact with the remote device 120.

The remote device 120 of the present embodiment also comprises a processing unit 121 comprising one or more processors 121a and computer-readable memory 121b. As with the user device 110, the computer-readable memory 121b of the remote device 120 is adapted to store computer program instructions which, when executed by the one or more processors 121a, may cause the remote device 120 to perform the respective steps carried out by the remote device 120 in any of the methods disclosed herein. Together, the one or more processors 121a and the computer-readable memory 121b of the remote device 110 form apparatus for controlling the remote device 120 to interact with the user device 110.

In addition, the remote device 120 of the present embodiment further comprises a wireless interface 122, and device information 123 stored in memory. Depending on the embodiment, the device information 123 may be stored in the same physical memory 121b used by the processing unit 121, or may be stored in separate memory. The remote device 120 can transmit the device information 123 to the user device 110 via the respective wireless interfaces 122, 112 included in the remote device 120 and the user device 110. After sharing the device information 123, the user device 110 and remote device 120 can subsequently interact with one another by transmitting and receiving signals via the respective wireless interfaces 112, 122. Although in the present embodiment the device information 123 is transmitted over the same wireless connection that is used for subsequent interaction between the user device 110 and the remote device, in other embodiments the device information 123 can be transmitted over a different connection.

The device information 123 defines one or more types of interaction that can occur between the user device 110 and the remote device 120. The particular types of interaction that are supported by any given remote device 120 may depend upon the capabilities of that particular device. For example, in the present embodiment the remote device 120 comprises an actuator 124 and a sensor 125. In this embodiment, the user device 110 may interact with the remote device 120 in order to control the actuator 124 to operate a physical mechanism, for example a door lock, and/or may interact with the remote device 120 in order to read data from the sensor 125. The types of interaction that are made available to the user device 110, that is to say, the types of interaction defined by the device information that is transmitted to the user device 110 may depend not only on the hardware capabilities of the remote device 120, but may depend on other factors such as the security level of a current user. Also, it should be understood that the actuator 124 and sensor 125 are illustrated by way of an example only, and it is not necessary for all remote devices in embodiments of the present invention to include both an actuator and a sensor.

The device information 123 can be provided in a predefined format, which is capable of being understood by a corresponding application installed on the user device 110. The application may be referred to as a Point-to-Point Global Discovery Service (PPGDS) application. When the user device 110 connects to the remote device 120, the application on the user device 110 can start a discovery process in order to discover the available services and capabilities of the remote device 120. In the present embodiment a local discovery process in used, in which the application requests the device information 123 from the remote device 120. In another embodiment a remote discovery process may be used, in which the application can request the device information 123 from a server. Upon receiving the device information 123, the application parses the discovery information 123 to determine the types of interaction that are supported by the remote device 120, and generates a customised user interface (UI) including a control element associated with each type of interaction supported by the remote device 120. In some embodiments the device information can also determine the structure and layout of control elements in the UI.

In the present embodiment a graphical user interface (GUI) is generated. However, embodiments of the present invention are not limited to GUIs. In other embodiments a different type of UI may be generated based on the device information, for example a voice interface, gesture-based interface, haptic interface, eye-tracking interface, or so on. The type of control elements defined by the device information may depend upon the type of UI used in the particular embodiment. For example, in a voice interface the control elements may be keywords or phrases which can be spoken by the user to control different functions of the remote device, or in a gesture-based interface the control elements may be different gestures.

The device information 123 allows the remote device 120 to signal to the user device 110 how the user device 110 can interact with the remote device 120. This enables the user device 110 to connect to, and interact with, different types of remote device 120 without having any knowledge in advance of the capabilities of each particular remote device 120. In addition, the device information 123 can be used by the user device 110 to configure a user interface (UI) specifically for interacting with that particular remote device 120. Therefore when the user device 110 connects to the remote device 120 for the first time, the user device 110 can dynamically generate a UI that is tailored to the capabilities of that particular remote device 120, avoiding the need to have a suitable UI pre-installed at the user device 110. This approach may be particularly advantageous in an IoT context, in which the user device 110 may be capable of connecting to a wide variety of IoT devices which may have very different capabilities.

Referring now to FIG. 2, a user interface displayed at the user device of FIG. 1 is illustrated, according to an embodiment of the present invention. The UI 200 comprises a plurality of UI elements 201, 202, 203 for controlling the user device 110 to interact with the remote device 120. The user device 110 generates the UI 200 based on the device information 123 received from the remote device 120, by selecting appropriate UI elements for the types of interaction that are defined in the device information 123 as being supported by the remote device 120. The user device 110 then displays the configured UI 200 on the display 113. In the present embodiment the display 113 is included in the user device 110, but in other embodiments the user device 110 could output the configured UI 200 to a physically separate display device.

In the present embodiment, the device information is provided in Hyper-Text Markup Language (HTML) format, and the user device 110 configures the UI by parsing and rendering the HTML device information. As an example, a UI element can be defined using the HTML input element, with the type of interaction being defined by use of the "type" attribute in the <input> tag. For instance, in the present embodiment the switch UI element 202 for turning a security light on/off at the remote device 120 can be defined in the device information by setting the input type to "button", as follows:

```
<html>
<body>
    <input type="button" value= "Light on/off" / >
</body>
</html>
```

When parsed by the application on the user device 110, this will result in the UI element being rendered as a button in the UI 200. Similarly, the input element 201 shown in FIG. 2 for controlling a time at which the security light will be automatically turned on or off can be defined using the "text" HTML input type, and the input element 203 for controlling the brightness can be defined using the "range" HTML input type. These UI elements are described purely by way of example, and other types of UI element may be used in other embodiments, depending on the types of interaction that are supported by the remote device.

In some embodiments, the device information 123 can further comprise a script that the application on the user device 110 can use to convert the user input into an interaction request capable of being understood by the remote device 120. This can allow the user device 110 to interact with any remote device 110 without having to install a dedicated application for controlling that particular remote device 110, and without the user device 110 having any knowledge in advance of the signalling format required by the remote device 120. Taking the example of the switch UI element 202, the device information 123 can include a script for generating signalling capable of being understood by the remote device 120 in response to the UI element being selected by the user input, as follows:

```
<html>
<body>
    <input type="button" value= "Light on/off" onClick="lightSwitch( )" />
<script type="text/javascript">
    function lightSwitch( ) {
        AppInterface.writeBLECharWithRssi("0000FE01-0000-1000-8000-00805F9B34FB", 1);
    }
</ body>
</ html>
```

In the above example, the writeBLECharWithRssi function can be defined in the application installed on the user device 110, which operates the wireless interface module in the user device 110 in order to generate an interaction request that is capable of being understood by the remote device 120.

Once the UI 200 has been displayed, a user may then control the user device 110 via the UI elements in order to interact with the remote device 120. For example, the UI 200 illustrated in FIG. 2 may be displayed on a touch screen display 113, and the user device 110 may receive user input relating to one of the UI elements in the form of touch events or drag gestures. In response to the user input, the processing unit 111 of the user device 110 controls the user device 110 to interact with the remote device 120 in accordance with the UI element to which the received user input relates, and in accordance with the received user input, by way of signalling transmitted via the wireless interface 112.

In some embodiments, the application at the user device 110 can render the UI elements using stored textures, each texture being associated with a particular predefined type of UI element. The textures could be pre-installed at the user device 110, or could be retrieved from a web address identified by a Uniform Resource Identifier (URI) defined in the device information 123. In some embodiments, the device information can define how the UI elements should be displayed, for example by defining the size, shape, orientation and/or position of each UI element in the UI. This gives the manufacturer of the remote device 120 even greater control over how the UI interface will appear on the user device 110.

Figure 3:
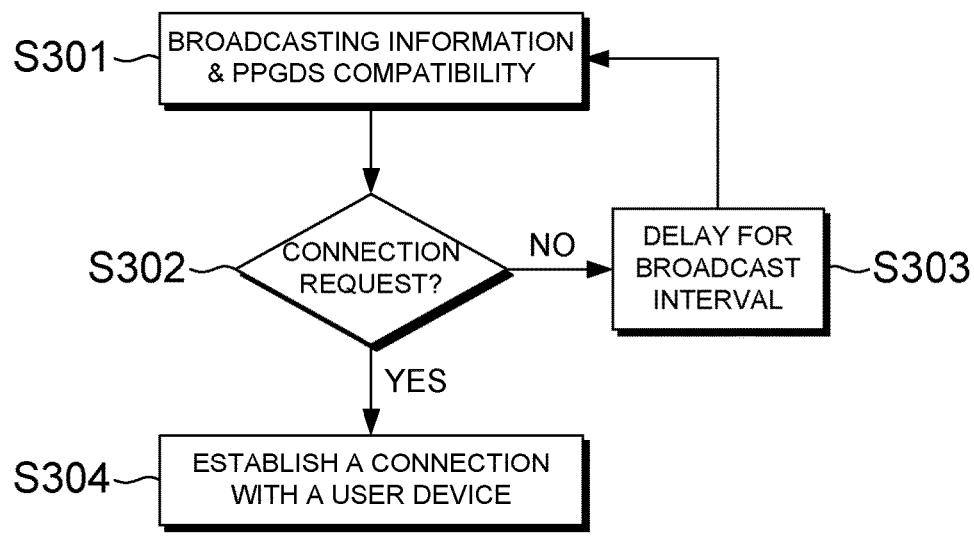
FIG. 3 is a flowchart showing steps performed by the remote device during device discovery, according to an embodiment of the present invention.
Figure 4:
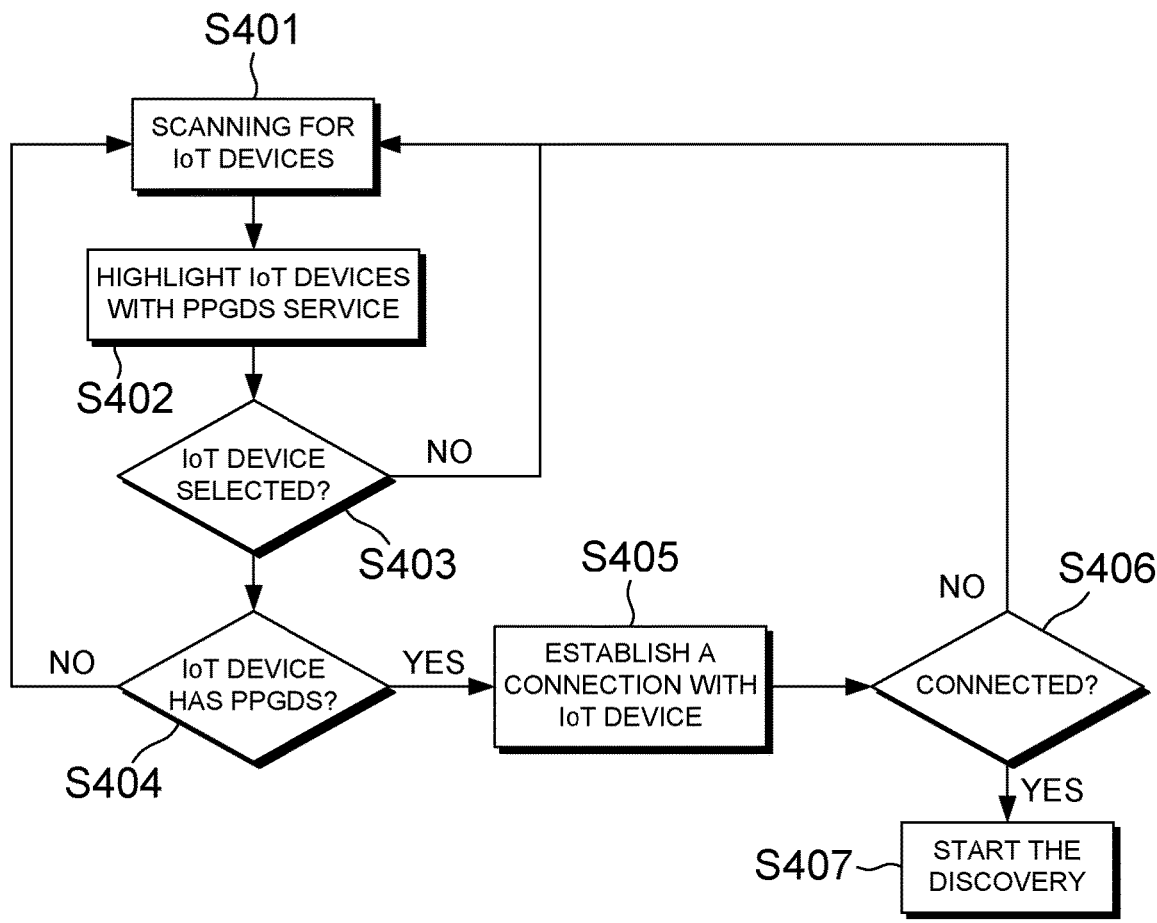
FIG. 4 is a flowchart showing steps performed by the user device during device discovery, according to an embodiment of the present invention.

A device discovery procedure will be described with reference to FIGS. 3 and 4, according to an embodiment of the present invention. The procedure can be used to enable a user device to identify, and connect to, available remote devices which support PPGDS in the current vicinity. FIG. 3 is a flowchart showing steps performed by the remote device during device discovery, and FIG. 4 is a flowchart showing steps performed by the user device during device discovery. The device discovery procedure may be used in a system comprising the user device 110 of FIG. 1 and one or more remote devices similar to the one shown in FIG. 1.

Depending on the embodiment, any given remote device may be configured to be discovered either locally or remotely. As shown in FIG. 3, in step S301 a remote device repeatedly broadcasts a discovery message which indicates whether the remote device is compatible with a predefined protocol for controlling interactions between the user device and the remote device. For example, the protocol may be defined by an industry standard or proprietary standard which defines both the structure of the device information, and how the UI should be generated based on the device information. In the present embodiment, the predefined protocol is PPGDS. If a remote device supports PPGDS, this means that device information which can be parsed by the PPGDS application is available for that remote device, thereby enabling the user device to interact with the remote device. Such devices may be referred to as PPGDS-enabled remote devices. A PPGDS-enabled remoted device will have a first PPGDS application installed which can interpret and act upon interaction requests received from the user device. A PPGDS-enabled user device will have a corresponding second PPGDS application installed which is capable of generating interaction requests in a format that can be understood by the first PPGDS application at the remote device.

After broadcasting the discovery message, in steps S302 and S303 the remote device 120 waits for a connection request from a user device 110, and periodically retransmits the discovery message if no connection request is received. Once a connection request is received in step S302, the remote device 120 establishes a connection with the user device 110.

In step S401, the user device 110 continually scans for any discovery messages received via the wireless interface 112. During the scanning process, a discovery message may be received from a remote device that was previously unknown to the user device. By 'previously unknown', it is meant that the user device has not previously communicated with or interacted with this particular remote device, and therefore has no prior knowledge about the types of interaction that may be supported by this remote device. In this way, the user device 110 can discover and interact with previously unknown devices, without additional software needing to be installed.

When a discovery message from a remote device 120 is received via the wireless interface 112, the user device 110 adds the remote device 120 to a list of available remote devices in step S402. In the present embodiment, the list includes any BLE devices which are currently within range of the user device 110. Within the list, any PPGDS-enabled remote devices can be highlighted. In response to user selection of a BLE device from the list in step S403, the user device 110 checks whether the selected device is one of the PPGDS-enabled remote devices in step S404. If not, the user device 110 resumes scanning and waits for a PPGDS-enabled remote device 120 to be selected. In another embodiment, the user device 110 can be configured to only include PPGDS-enabled devices in the displayed list of available devices, in which case the additional check after the user has made a selection could be omitted. Once the user selects a PPGDS-enabled remote device 120, the user device 110 establishes a connection with the remote device 120 via the wireless interface 112 in step S405, and checks that the connection was successful in S406. For example, the connection may be unsuccessful if wireless reception between the user device 110 and the remote device 120 is lost during the process of establishing the connection.

In the present embodiment, after the connection to the remote device 120 has been opened, the remote device 120 signals to the user device 110 whether local or remote discovery should be used, and whether a password is required to interact with the remote device 120. In the present embodiment, the user device 110 receives metadata from the remote device 120 which includes 'Discovery Mode' and 'Password Requirement' attributes. The 'Discovery Mode' attribute indicates to the user device 110 whether local or remote discovery should be used, and the 'Password Requirement' attribute indicates whether or not the user device 110 must pass an authorisation process before interacting with the remote device 120. In other embodiments, the information about the type of discovery mode and/or the information about a password requirement may be included in the discovery message broadcast by the remote device 120, and may therefore be obtained by the user device 110 before opening a connection to the remote device 120.

If the user device 110 has not previously interacted with a remote device 120, it will be necessary to obtain device information in order to configure the UI for that particular remote device 120. Additionally, in some embodiments the user device 110 can be configured to always check for updated device information when opening a connection to a remote device 120, even if the user device 110 has previously obtained device information for that particular remote device 120. This allows the types of available interaction to be modified under different conditions, for example at different times of day, by providing the user device 110 with updated device information according to the current conditions.

As explained above, in some embodiments a user device may support both local and remote discovery modes. In the present embodiment the user device determines whether to perform local or remote discovery according to the type of discovery mode specified by the remote device, in order to retrieve the device information associated with the remote device 120 in step S407. Therefore in the present embodiment, once a connection has been established to a remote device 120, the user device 110 checks the status of the Discovery Mode attribute received from the remote device 120 to determine whether to use local or remote discovery. This provides interoperability with different types of remote device, some of which may support local discovery and others of which may support remote discovery. In other embodiments, all devices in the system (i.e. any user devices and remote devices) could be configured to always use local discovery or to always use remote discovery.

Figure 5:
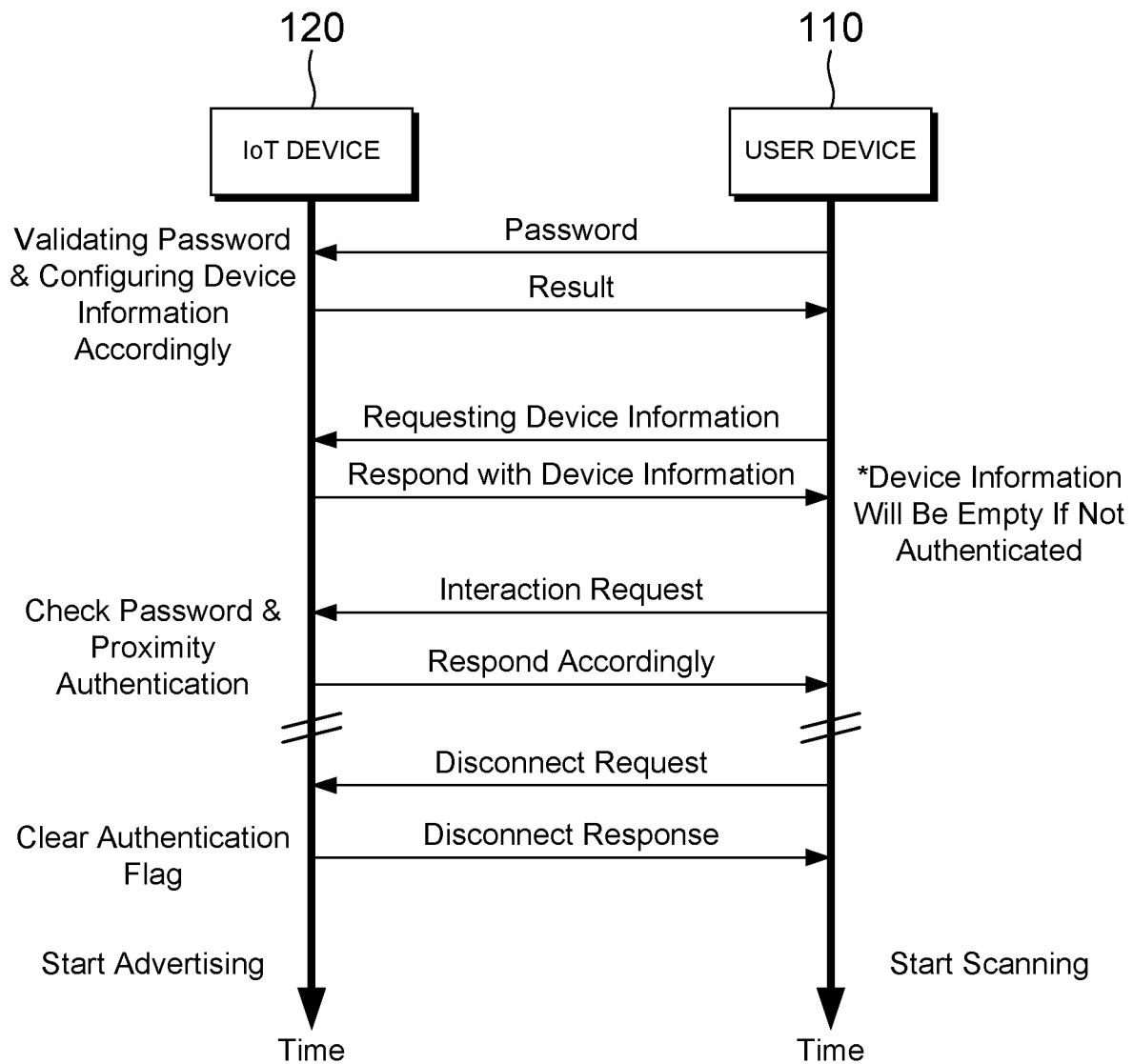
FIG. 5 illustrates a sequence of communications exchanged between a remote device and a user device during the local discovery procedure, according to an embodiment of the present invention.
Figure 6:
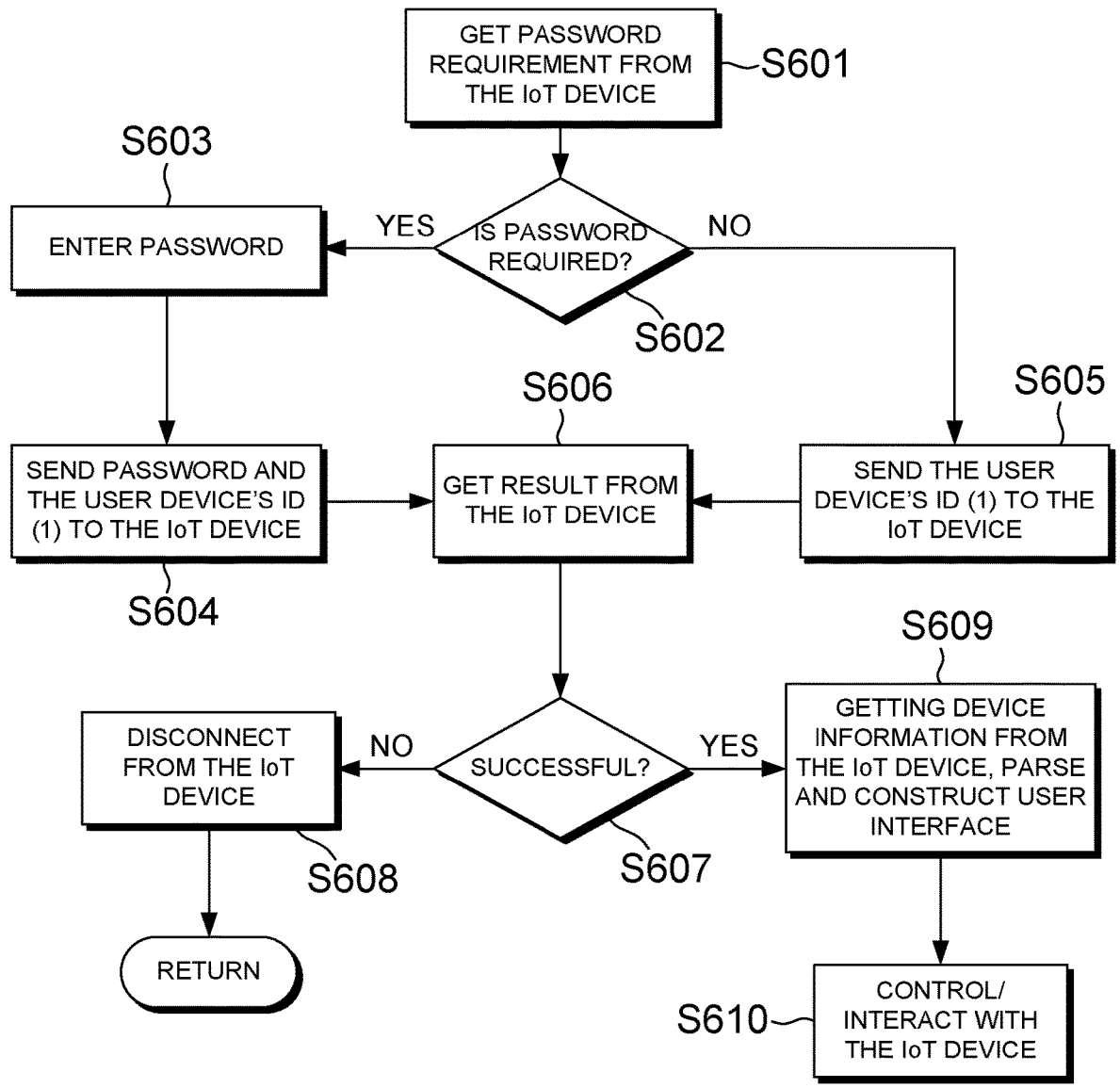
FIG. 6 is a flowchart showing steps performed at the user device during the local discovery procedure, according to an embodiment of the present invention.

A local discovery procedure for retrieving device information will now be described with reference to FIGS. 5 and 6. FIG. 5 illustrates a sequence of communications exchanged between a remote device and a user device during the local discovery procedure, according to an embodiment of the present invention. FIG. 6 is a flowchart showing steps performed at the user device during the local discovery procedure. The discovery procedure illustrated in FIGS. 5 and 6 may be used with the remote device 120 and user device 110 of FIG. 1, in which the device information 123 is stored locally at the remote device 120.

The flowchart shown in FIG. 6 starts after device discovery has been performed, and a connection has been established with a remote device. In the present embodiment, the user device 110 starts by obtaining the Password Requirement attribute from the remote device 120 in step S601. The user device 110 then checks the Password Requirement attribute at step S602, to determine whether a password is required by this remote device 120. If a password is required, then in step S603 the user device 110 may prompt a user to enter the password, and transmit the user-inputted password to the remote device 120 together with an identifier (ID) of the user device 110 in step S6-4. Alternatively the user device 110 may retrieve a stored password, which may be one that has been previously entered by the user. If a password is not required, then the user device 110 just transmits its own ID to the remote device 120 in step S605. Furthermore, in other embodiments local discovery may be implemented without requiring a password or ID from the user device 110, in which case the remote device 120 is open to interact with any user device 110.

Depending on the embodiment, the remote device 120 may perform authentication and/or authorisation based on the received password and user device ID, and only allow the user device 110 to interact if it has been successfully authenticated and/or authorised. If the required authorisation and/or authentication process is successful, then the remote device 120 sets the value of an internal flag 'isPasswordAuthenticated' in memory to indicate that the user device 110 is authorised throughout the current connection session. The remote device 120 then responds to the user device 110 in step S606 with the result of the authentication/authorisation process.

The user device 110 checks the result of the authentication/authorisation process in step S607. If the result is unsuccessful (i.e. user device 110 is either not authenticated and/or not authorised), then in step S608 the user device 110 closes the connection to the remote device 120 since the remote device 120 will not permit interaction with this particular user device 110. On the other hand, if the result is successful, then in step S609 the user device 110 requests the device information from the remote device 120. The remote device 120 receives the request, retrieves the stored device information 123, and transmits the device information 123 to the user device 110. The user device 110 can then parse the device information, configure the UI, and display the configured UI, using the procedure described above with reference to FIGS. 1 and 2. The user device 110 can subsequently transmit an interaction request in step S610 in response to user input, as shown in FIG. 5, and the remote device 120 can respond according to the type of interaction that has been requested.

By using a local discovery procedure such as the one described above with reference to FIGS. 5 and 6, a user device can connect to a remote device and configure a UI for interacting with the remote device solely on the basis of the received device information, without the need to request any additional information from another source. Additionally, by including a script in the device information which can be used to generate an interaction request capable of being understood by the remote device, the user device can learn how to interact with a remote device without having to download additional software, e.g. from an Internet server. The script can tell the application on the user device how to generate internal control signals which will cause the user device to generate the interaction request. Accordingly, the user device 110 and remote device 120 can establish a connection and interact with one another in the absence of an Internet connection or other network connection.

Figure 7:
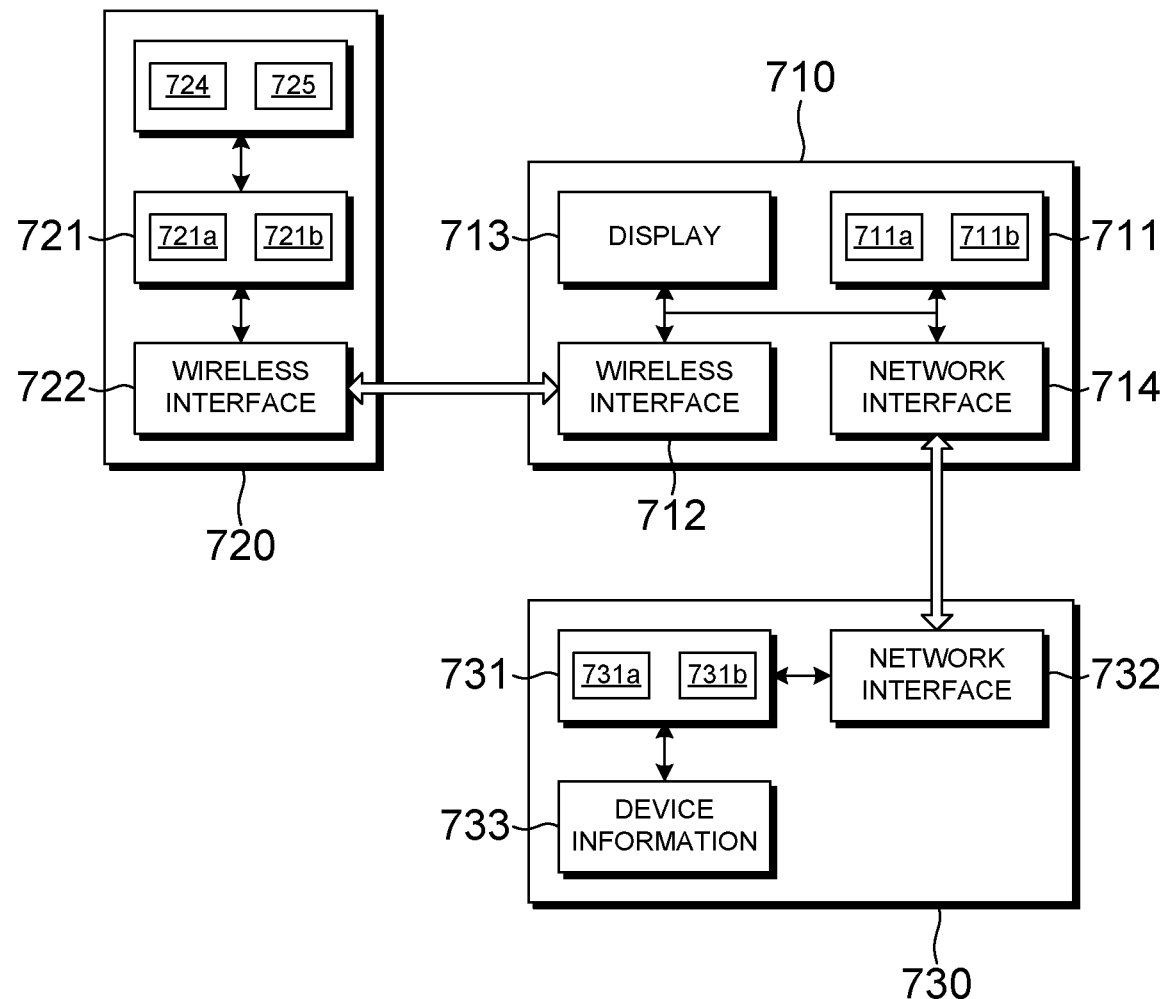
FIG. 7 illustrates a system comprising a user device, a remote device, and a server for providing device information associated with the remote device, according to an embodiment of the present invention.

In the embodiment illustrated in FIGS. 5 and 6, device information is stored locally at the remote device. In other embodiments, a remote discovery procedure may be used, in which the device information is stored on a web server. Referring now to FIG. 7, a system comprising a user device, a remote device, and a server for providing device information associated with the remote device is illustrated, according to an embodiment of the present invention.

The user device 710 of the present embodiment comprises a processing unit 711 comprising one or more processors 711a and computer-readable memory 711b, a wireless interface 712, and display 713. The remote device 720 comprises a processing unit 721 comprising one or more processors 721a and computer-readable memory 721b, wireless interface 722, actuator 724 and sensor 725. These elements are similar to the corresponding elements of the user device 110 and remote device 120 of the embodiment shown in FIG. 1, and a detailed description will not be repeated here.

In addition, the user device 710 of the present embodiment further comprises a network interface 714 for communication with the server 730, which may be an Internet server or a server on a local network. The server 730 comprises a processing unit 731 comprising one or more processors 731a and computer-readable memory 731b, a network interface 732, and device information 733. As with the user device 110 and the remote device 120 of FIG. 1, the computer-readable memory 731b of the server 730 is adapted to store computer program instructions which, when executed by the one or more processors 731a, may cause the server 730 to perform the respective steps carried out by the server 730 in the remote discovery procedure disclosed herein. Together, the one or more processors 731a and the computer-readable memory 731b of the server 730 form apparatus for controlling the server 730 to provide the device information 733 to the user device 710. As with the embodiment of FIG. 1, in the present embodiment the device information 733 may be stored in the same physical memory 731b used by the processing unit 731, or may be stored in separate memory.

Figure 8:
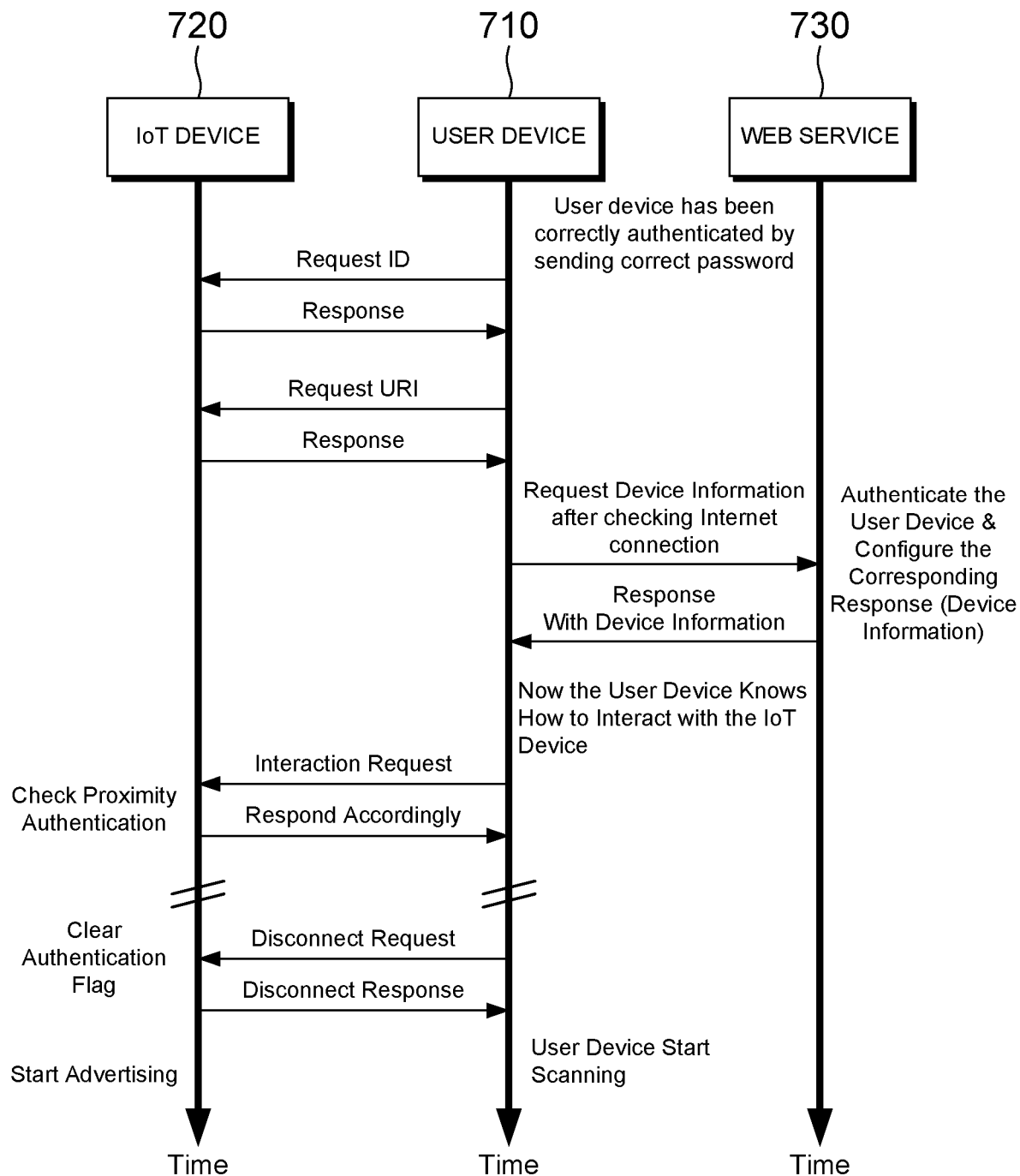
FIG. 8 illustrates a sequence of communications exchanged between a remote device, a server and a user device during a remote discovery procedure, according to an embodiment of the present invention.
Figure 9:
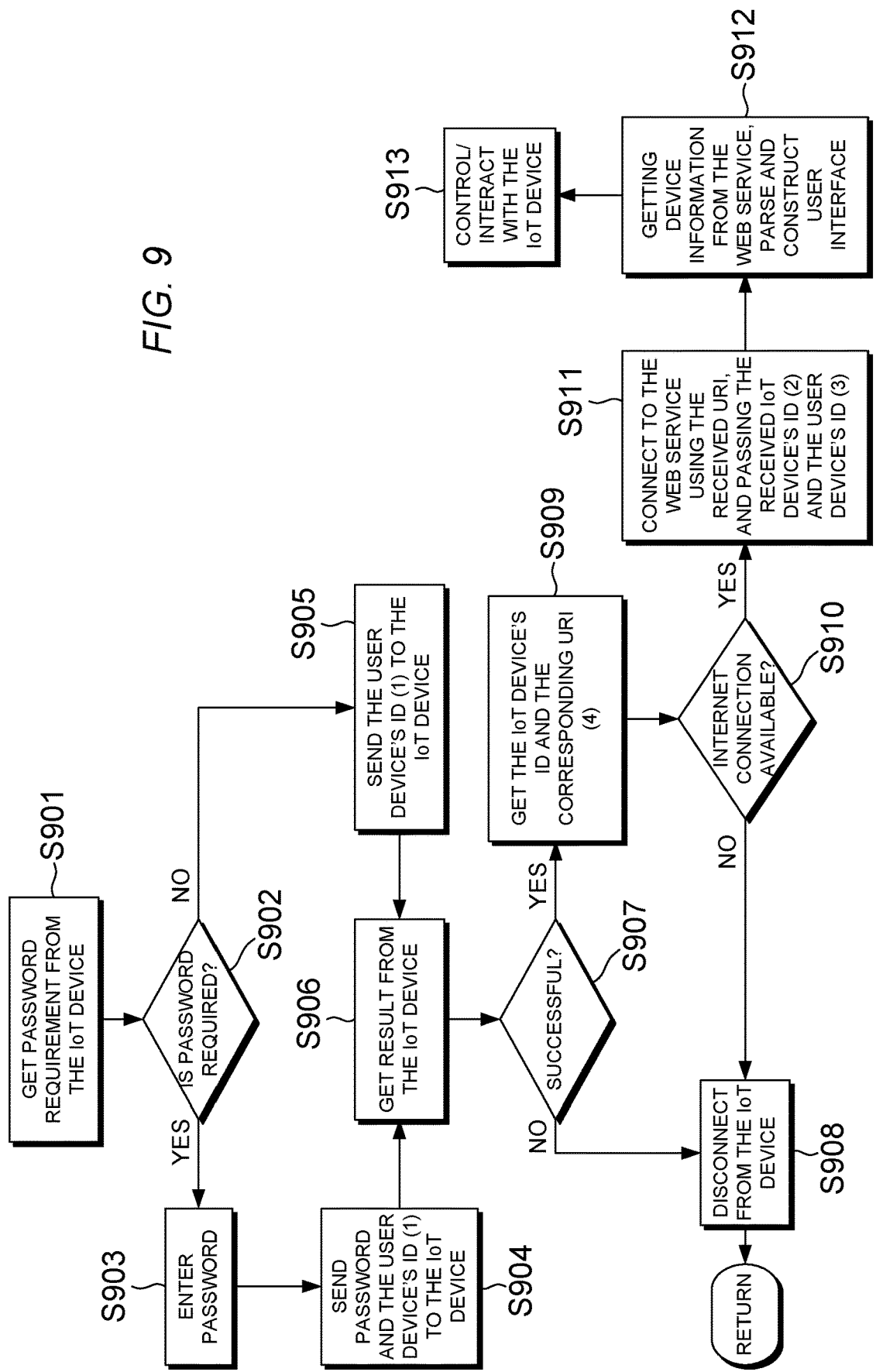
FIG. 9 is a flowchart showing steps performed at the user device during the remote discovery procedure, according to an embodiment of the present invention.

A remote discovery procedure which can be performed by the system shown in FIG. 7 will now be described with reference to FIGS. 8 and 9, according to an embodiment of the present invention. FIG. 8 illustrates a sequence of communications exchanged between a remote device, a server and a user device during the remote discovery procedure, according to an embodiment of the present invention. FIG. 9 is a flowchart showing steps performed at the user device during the local discovery procedure.

The first steps in the method shown in FIG. 9, and the first communications transmitted in FIG. 8, are similar to those of the local discovery procedure shown in FIGS. 5 and 6, and a detailed description will not be repeated here. As with steps S601 to S605 of the local discovery procedure illustrated in FIG. 6, in steps S901 to S905 of the remote discovery procedure the user device 710 establishes whether or not authorisation is required, and prompts the user to enter a password if one is required. The remote device 720 then determines whether authentication and/or authorisation is successful, and signals the result to the user device 710 in step S906. The user device 710 checks the result of the authentication/authorisation process in step S907. If the result is unsuccessful, then in step S908 the user device 710 closes the connection to the remote device 720 since the remote device 720 will not permit interaction with this particular user device 710.

In both local and remote discovery, the two devices stay connected until one of them terminates the connection. Whenever the connection between the remote device and the user device is terminated, if authentication or authorisation is required, the remote device resets the flag 'isPasswordAuthenticated' if the remote device is configured with password requirement. This ensures that any user device needs to be authenticated and authorised correctly in every connection session, and prevents user devices from interacting with remote devices by using a historical connection, which may have been established in the past by a different user.

The remote discovery procedure deviates from the local discovery procedure once the user device 710 has been successfully authenticated and/or authorised by the remote device 720 in step S907. At that point, the user device 710 requests the remote device's own unique ID and a URI of the server 730 in step S909. The remote device 720 responds with the requested information, which is stored locally in memory at the remote device 720.

In the present embodiment, after receiving the ID and URI from the remote device 720, in step S910 the user device 710 checks whether a network connection is currently available via the network interface 714. If not, then the user device 710 can close the connection to the remote device 720 since it will not be able to retrieve the device information 733 from the server 730. If the network connection is available, then the user device 710 establishes a connection with the server 730 in step S911, and in the present embodiment transmits an HTTP request for the device information (GET command) using the URI and ID provided by the remote device 720.

The HTTP GET command is used in the present embodiment for compatibility with Internet servers, but in other embodiments a different format may be used when requesting the device information. In some embodiments, the user device 710 may also include its own unique ID, for example a serial number, in the request for device information to allow the server to perform any extra security/authorisation process. The HTTP GET command may be generated by concatenating the URI with the remote device's ID and the user device's ID, in the format <URI>/<remote device ID>/<user device ID>.

The server 730 may store device information 733 for a plurality of different remote devices. In such cases, the device information 733 for a specific remote device can be stored in associated with the ID of the corresponding remote device. When the server 730 receives the request for device information, it retrieves the stored device information 733 that is associated with the remote device ID that was included in the request, and transmits the retrieved device information 733 to the user device 710. In some embodiments the server 730 may be configured to authenticate the user device 710, and may only transmit the device information 733 in response to successful authentication of the user device 710.

Upon receiving the device information 733 in step S912, the user device 710 can then configure the UI and interact with the remote device 720 in step S913, in a similar manner to that described above for the local discovery procedure.

Embodiments of the invention have been described in which a remote device 120 or a server 730 retrieves stored device information and transmits it to a user device 110, 710. In some embodiments, the device information may be customised before sending it to the user device 110, 710, for example based on a security level of the authenticated user of the user device 110, 710. In such embodiments, the stored device information may define one or more types of interaction that are only permitted for a certain one of a plurality of predefined security levels, and the device information can be customised so as to only define those types of interaction which are permitted for the security level of the current user. For example, a user with a low security level may only be permitted to read data from a temperature sensor included in the remote device 120, 720, whereas a user with a higher security level may be able to change a temperature set point that triggers a certain action at the remote device 120, 720.

In some embodiments, the user may be authenticated and/or the security level may be determined based various parameters, such as the user's identity (ID), a password, and/or a proximity of the user device 110, 710 to the remote device 120, 720. When proximity is used, the user can be authenticated and/or a different security level can be selected according to whether the distance between the user device 110, 710 and the remote device 120, 720 is above or below a threshold.

For example, the proximity may be determined using Global Positioning System (GPS) coordinates of the user device 110, 710 and the remote device 120, 720, or may be determined based on the power level of a signal from one of the devices that is received by the wireless interface 112, 122, 712, 722 in the other device. Preferably, for security, the determination of the distance between the remote device 120, 720 and the user device 110, 710 is made by the remote device 120, 720, to avoid the user device 110, 710 providing a fake distance in order to bypass location-based security restrictions. For example, in some embodiments the remote device 120, 720 can be configured to measure the power level of a signal received from the user device 110, 710 at the wireless interface 122, 722, such as the interaction request received from the user device 110, 710, and determine the distance to the user device 110, 710 according to the following equation:

$$\text{path loss} = 40 + 25 \log(d)$$

where d is the distance between the transmitter and the receiver. In some scenarios the remote device 120, 720 may only use the measured distance as a rough estimate since the received radio signal can be strongly influenced by noise and interference, and so may take into account a likely margin of error in the measurement when comparing the measured distance to the predefined threshold.

Furthermore, in some embodiments in which remote discovery is used, customised discovery information for different security levels can be provided by providing different URIs for different security levels. In such embodiments, the remote device 720 can determine the security level of the current user when receiving the request for the URI from the user device 710, and respond with the URI associated with the determined security level. This results in the user device 710 retrieving different device information from the server 730 according to the security level determined by the remote device 720, and allows the remote device 720 to customise the level of control that will be granted to the user. Alternatively, instead of providing different URIs, the customisation of device information could be carried out at the server-side, as described above.

In some embodiments, other conditional interaction types can be defined in the device information. A conditional interaction is one which is only permitted if an associated condition is fulfilled. Examples of conditions that may be attached to certain interactions include, but are not limited to: the date or time of day; the identity of the user device; current weather conditions; and how busy or crowded the location of the remote device is. When asked to provide device information, the remote device 120 (in the case of local discovery), or the server 730 (in the case of remote discovery) can check for each conditional interaction whether the associated condition is fulfilled, and only include the conditional interaction in the transmitted device information if the condition is fulfilled. For example, this allows certain functions of the remote device to only be accessed at certain times of day, or under certain weather conditions, and so on.

In some embodiments of either the local or remote discovery procedures, a multi-factor authentication (MFA) method may be used. MFA can be used to confirm the identity of the current user, whereby a user may only be granted access to certain types of interaction after successfully presenting a plurality of different pieces of information. By using a plurality of different pieces of information, security is improved since it becomes less likely that an unauthorised party will be able to successfully provide all of the correct information. Examples of types of information that may be required when MFA is used in embodiments of the present invention include, but are not limited to:

Knowledge: information that is known only to the particular individual, such as a password or other secret.

Possession: information that a user physically possesses, such as a recognised user device as identified by the user device ID. When used with local discovery, this may require extra memory to be available at the remote device 120 for storing a plurality of user device IDs for use in validation. When used with remote discovery, the user device ID may be included in the request transmitted to the server 730, as described above.

Proximity: a threshold minimum or maximum distance between the user device 110, 710 and the remote device 120, 720 in order for authentication to be successful.

Access Level Control: different authorised users can be assigned different security levels and granted different levels of access accordingly, as described above.

Dynamic Rules Assignment: the behaviour of a remote device can be dynamically tailored and determined based on a set of rules that can be added, based on certain applications, for a variety of users and under certain conditions. This can be implemented particularly efficiently in systems which use remote discovery, as the rules for modifying the remote devices behaviour can be defined and customised centrally at the server, rather than having to separately update a set of rules stored locally at each remote device.

In embodiments of the present invention, a user device can use a single generic application to discover various remote devices that may provide different functionality. By creating a common working environment standard that any device can use to offer interaction, and by providing a high level of interoperability between different devices, it is expected that embodiments of the invention will have a major impact on the future of the deployment of the IoT.

Whilst certain embodiments of the invention have been described herein with reference to the drawings, it will be understood that many variations and modifications will be possible without departing from the scope of the invention as defined in the accompanying claims.

The invention claimed is:

1. A method of interacting with a remote device via a user device, the method comprising:

discovering a remote device capable of interacting with the user device;

receiving device information uniquely associated with the discovered remote device at the user device, the device information having been generated prior to having been received at the user device at least partially based on specifications provided by the manufacturer of the remote device, wherein:

the device information is independent of the user device and defines a plurality of types of interaction between the user device and the remote device that correspond to capabilities of the remote device, the device information comprising a script configured for converting user input received at the user device into an interaction request capable of being understood by the remote device and transmitted by the script calling a local program function in an application pre-installed on the user device to operate a communications interface in the user device, the application being configured to support a plurality of types of communications interfaces including the communications interface in the user device, the script being uniquely associated with the remote device and independent of the user device; and the device information defines design elements of a related user interface (UI) including how a plurality of UI elements should be displayed in the UI and a size, shape, orientation, and position of each of the plurality of UI elements, the defined design elements being uniquely associated with the remote device and independent of the user device;

constructing, by the application, the UI at the user device based on the received device information by selecting and configuring the plurality of UI elements as defined by the device information for controlling the user device to interact with the remote device, the plurality of UI elements being selected and configured based on the plurality of types of interaction defined by the device information such that the UI is constructed by the user device to include a control element associated with each of the plurality of types of interaction defined by the device information, wherein a structure and a layout of the control element associated with each of the plurality of types of interaction defined by the device information is based on the received device information including the size, shape, orientation, and position of the UI elements;

receiving user input relating to one of the one or more UI elements;

operating the script on the user device to convert the received user input into an interaction request capable of being understood by the remote device and transmitted by the script calling the local program function in the application to operate the communications interface in the user device; and causing the user device to interact with the remote device in accordance with the UI element to which the received user input relates, and in accordance with the received user input, by transmitting said interaction request to the remote device.

2. The method of claim 1, wherein receiving the device information comprises:

receiving a device identifier and a Uniform Resource Identifier (URI) from the remote device or from a server;

sending a request for the device information to the server or another server identified by the URI, the request including the received device identifier; and receiving the device information from the server or the another server.

3. The method of claim 1, wherein the device information is received from the remote device.

4. The method of claim 1, wherein the user device is configured to interact with the remote device in accordance with a predefined protocol, and discovering a remote device capable of interacting with the user device comprises:

performing device discovery to discover one or more remote devices; and for each of the discovered one or more remote devices, determining that the remote device is capable of interacting with the user device if the remote device supports the predefined protocol.

5. The method of claim 1, wherein the UI is a graphical user interface (GUI) and the method further comprises: displaying the UI.

6. The method of claim 5, wherein for each of the plurality of UI elements the device information identifies one of a plurality of predefined UI element types, and displaying the UI comprises:

for each of the plurality of UI elements, retrieving a stored texture associated with the type of UI element identified by the device information; and rendering the UI element using the retrieved texture.

7. A method comprising:

retrieving device information stored at a remote device for configuring a user interface (UI) for controlling a user device to interact with the remote device via respective communications interfaces in the remote device and the user device, the device information being uniquely associated with the remote device, wherein:

the device information is independent of the user device and defines a plurality of types of interaction between the user device and the remote device that correspond to capabilities of the remote device, the device information comprising a script configured to convert user input received at the user device into an interaction request capable of being understood by the remote device and transmitted by the script calling a local program function in an application pre-installed on the user device to operate the communications interface in the user device, the application being configured to support a plurality of types of communications interfaces including the communications interface in the user device, the script being uniquely associated with the remote device and independent of the user device; and the device information defines design elements of a related UI including how a plurality of UI elements should be displayed in the UI and a size, shape, orientation, and position of each of the plurality of UI elements, the defined design elements being uniquely associated with the remote device and independent of the user device; and transmitting the device information to the user device, wherein the device information at least partially corresponds to specifications provided by the manufacturer of the remote device, and the device information contains information usable by the application on the user device to construct the UI to include a control element associated with each of the plurality of types of interaction defined by the device information, wherein a structure and a layout of the control element associated with each of the plurality of types of interaction defined by the device information is based on the received device information including the size, shape, orientation, and position of the UI elements.

8. The method of claim 7, further comprising:

receiving an interaction request from the user device at the remote device, the interaction request identifying one of the plurality of types of interaction; and causing the remote device to interact with the user device in accordance with the received interaction request.

9. A method comprising:

receiving a request for device information for configuring a user interface (UI) for controlling a user device to interact with a remote device via respective communications interfaces in the remote device and the user device, wherein:

the device information is independent of the user device and defines a plurality of types of interaction between the user device and the remote device that correspond to capabilities of the remote device, the device information comprising a script configured to convert user input received at the user device into an interaction request capable of being understood by the remote device and transmitted by the script calling a local program function in an application pre-installed on the user device to operate the communications interface in the user device, the application being configured to support a plurality of types of communications interfaces including the communications interface in the user device, the script being uniquely associated with the remote device and independent of the user device;

the device information defines design elements of a related UI including how a plurality of UI elements should be displayed in the UI and a size, shape, orientation, and position of each of the plurality of UI elements, the defined design elements being uniquely associated with the remote device and independent of the user device;

the request for device information includes a device identifier (ID) for identifying the remote device; and the request for device information is received at a server;

retrieving stored device information uniquely associated with the remote device identified by the received device ID, at the server; and transmitting the retrieved device information from the server to the user device, wherein the device information at least partially corresponds to specifications provided by the manufacturer of the remote device, and the device information contains information usable by the application on the user device to construct the UI to include a control element associated with each of the plurality of types of interaction defined by the device information, wherein a structure and a layout of the control element associated with each of the plurality of types of interaction defined by the device information is based on the received device information including the size, shape, orientation, and position of the UI elements.

10. The method of claim 9, further comprising:

receiving an interaction request from the user device at the remote device, the interaction request identifying one of the plurality of types of interaction; and causing the remote device to interact with the user device in accordance with the received interaction request.

11. The method of claim 1, wherein the device information defines one or more conditional interaction types, wherein each of the conditional interaction types is only permitted if an associated condition is fulfilled, and receiving device information comprises:
  selecting each of the one or more conditional interaction types according to whether or not the associated condition for said one of the conditional interaction types is fulfilled,
  wherein the received device information only defines the selected one or more conditional interaction types from among the plurality of conditional interaction types.

12. The method of claim 1, further comprising:
  authenticating a current user; and
  determining a security level of the authenticated user,
  wherein the device information only defines one or more types of interaction that are permitted for the security level of the authenticated user.

13. The method of claim 12, wherein at least one of the user is authenticated or the security level is determined based on at least one of:
  a user identity;
  a password;
  a token; or
  a proximity between the user device and the remote device, wherein at least one of the user is authenticated or a different security level is selected according to whether a distance between the user device and the remote device is above or below a threshold distance.

14. The method of claim 1 wherein the method is implemented using software stored on a non-transitory computer medium.

15. The method of claim 1 further comprising adding the remote device to a list of available remote devices after discovering the remote device.

16. The method of claim 1 wherein the application is configured to interact with at least a second remote device via a second communications interface that is different than a first communications interface of the first remote device by using the script to call a second local program function in the application to operate the second communications interface.

17. The method of claim 1 wherein the device information is provided in Hyper-Text Markup Language (HTML) format.

18. The method of claim 1 wherein the device information is received from at least one of the remote device or from a server separately from the application pre-installed on the user device.

* * * * *